United States Patent
Kovacs et al.

(10) Patent No.: US 10,326,753 B2
(45) Date of Patent: Jun. 18, 2019

(54) AUTHENTICATION VIA REVOCABLE SIGNATURES

(71) Applicant: INTERNATIONAL BUSINESS MACHINES CORPORATION, Armonk, NY (US)

(72) Inventors: Daniel Kovacs, Adliswil (CH); Kai Samelin, Rueschlikon (CH); Dieter Sommer, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 218 days.

(21) Appl. No.: 15/190,731

(22) Filed: Jun. 23, 2016

(65) Prior Publication Data
US 2017/0374033 A1    Dec. 28, 2017

(51) Int. Cl.
*H04L 29/06* (2006.01)
*H04L 9/32* (2006.01)
*H04L 9/08* (2006.01)

(52) U.S. Cl.
CPC ........ *H04L 63/0823* (2013.01); *H04L 9/0891* (2013.01); *H04L 9/3218* (2013.01); *H04L 9/3247* (2013.01); *H04L 9/3263* (2013.01); *H04L 63/123* (2013.01)

(58) Field of Classification Search
None
See application file for complete search history.

(56) References Cited

U.S. PATENT DOCUMENTS

| 6,108,783 | A | * | 8/2000 | Krawczyk | ............ H04L 9/3236 380/28 |
| 6,292,897 | B1 | * | 9/2001 | Gennaro | ................. H04L 9/321 713/156 |
| 7,028,181 | B1 | | 4/2006 | McCullough et al. | |
| 8,139,767 | B2 | | 3/2012 | Camenisch et al. | |

(Continued)

FOREIGN PATENT DOCUMENTS

CN    102045164 B    6/2013

OTHER PUBLICATIONS

G. Ateniese and B. de Medeiros, "On the Key-Exposure Problem in Chameleon Hashes," in Proc. SCN, 2005, vol. LNCS 3352, pp. 165-179, Springer-Verlag: New York, NY, USA.*

(Continued)

*Primary Examiner* — Lynn D Feild
*Assistant Examiner* — Vadim Savenkov
(74) *Attorney, Agent, or Firm* — Cantor Colburn LLP; Daniel Morris

(57) ABSTRACT

Methods, systems and computer program products are provided for authenticating a message via a revocable signature. The method includes, at a signing computer, generating first auxiliary data and second auxiliary data respectively dependent on a public key and a private key of a public-private key pair for the message. The signing computer hashes the message and the first auxiliary data via a chameleon hash algorithm, using a public hash key of a verifier computer, to produce a first hash value. The signing computer signs the first hash value, using a secret signing key of the signing computer, to produce a signature. The signing computer sends the message, the signature and the first auxiliary data to the verifier computer, and stores the second auxiliary data.

17 Claims, 4 Drawing Sheets

(56) References Cited

U.S. PATENT DOCUMENTS

| | | | |
|---|---|---|---|
| 8,572,730 B1 | 10/2013 | Sobel et al. | |
| 9,118,486 B2 | 8/2015 | Pritikin | |
| 2011/0126020 A1* | 5/2011 | Isshiki | H04N 21/2347 |
| | | | 713/176 |
| 2012/0072732 A1* | 3/2012 | Canard | H04L 9/3247 |
| | | | 713/176 |

OTHER PUBLICATIONS

G. Ateniese and B. de Medeiros. Efficient group signatures without trapdoors. In ASIACRYPT 2003, vol. 2894 of LNCS, pp. 246-268, Springer Verlag, 2003.*

Guo S, Zeng D, Yang X (2014) Chameleon hashing for secure and privacy-preserving vehicular communications. IEEE Trans Parallel Distrib Syst 25(11):2794-2803. doi: 10.1109/TPDS.2013.277.*

Ahto Buldas, et al.,"Efficient Quantum-Immune Keyless Signatures With Identity" May 17, 2014, Cryptology, ePrint Archives, p. 1-14.

Javier Lopez, et al.,"Information Security Practice and Experience" 11th International Conference Proceedings, May 5-8, 2015, p. 1-25.

Jianhong Zhang, et al.,"A Secure Chameleon Hash Function without Key Exposure from Pairings", Proceedings of the 2009 International Symposium , May 22-24, 2009, p. 1-4.

\* cited by examiner

AUTHENTICATION VIA REVOCABLE SIGNATURES

BACKGROUND

The present invention relates generally to authentication via revocable signatures, and more particularly to authentication of messages sent by signing computers to verifier computers via signatures that can be selectively revoked when desired.

Cryptographic signatures are widely used in computer systems to authenticate messages sent between computers. The sender (herein "signing computer") typically signs its message using a secret (private) signing key of a public-private cryptographic key pair. The signature is then sent with the message to the recipient (herein "verifier computer") which can verify authenticity of the signature using the public key of the sender's signing key pair. This public key is authenticated via a digital certificate issued by a trusted certification authority of a PKI (Public Key Infrastructure).

Signature revocation in standard schemes involves either revocation of signing rights (e.g. by revoking access to a signing server or by revoking a credential certifying the signer's right to sign with a signing key), or revocation of a signer's public key certificate whereby the certificate, including the public key, is invalidated for all signatures. All signatures of that signer are thereby revoked.

SUMMARY

According to at least one embodiment of the present invention there is provided a method for authenticating a message to a verifier computer via a revocable signature. The method includes, at a signing computer, generating first auxiliary data and second auxiliary data respectively dependent on a public key and a private key of a public-private key pair for the message. The signing computer hashes the message and the first auxiliary data via a chameleon hash algorithm, using a public hash key of the verifier computer, to produce a first hash value. The signing computer signs the first hash value, using a secret signing key of the signing computer, to produce a signature. The signing computer sends the message, the signature and the first auxiliary data to the verifier computer, and stores the second auxiliary data.

At least one further embodiment of the invention provides a computer program product comprising a computer readable storage medium embodying program instructions, executable by a signing computer, to cause the signing computer to perform the foregoing method. At least one additional embodiment of the invention provides a system for authenticating a message. The system comprises a signing computer that is adapted to perform the foregoing method, and a verifier computer that is adapted to authenticate the message by checking validity of the signature.

Embodiments of the invention are described in more detail below, by way of illustrative and non-limiting examples, with reference to the accompanying drawings.

DETAILED DESCRIPTION

Figure 1:
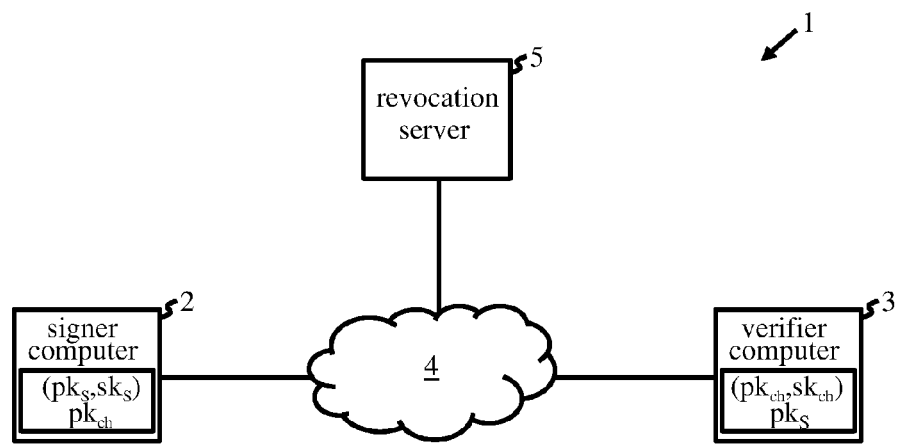
FIG. 1 is a schematic illustration of a computer system in which authentication methods embodying the invention may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic block diagram of an exemplary computer system 1 for implementing authentication methods embodying the invention. The system comprises a signing computer 2, which can communicate with a verifier computer 3 via a network 4. Signing computer 2 includes functionality for authenticating messages sent to verifier computer 3 via a revocable signature scheme detailed below. Verifier computer 3 includes corresponding functionality for verifying authenticity of received messages. In practice, system 1 typically includes multiple signer and verifier computers, each of which may include both signing and verification functionality. Moreover, signatures verified by one verifier computer 3 may be transferred to other verifier computers which themselves verify the signature. However, operation of the revocable signature scheme can be understood from the operations of signing computer 2 and verifier computer 3 described below. In the example of FIG. 1, the system 1 also includes a revocation server 5 with which computers 2, 3 can communicate via network 4. This revocation server 5 serves to publish information provided by signer computer 2 as explained below.

In general, network 4 may comprise one or more component networks and/or internetworks, including the Internet, and may include wired and/or wireless network links. The signer and verifier computers 2, 3 may be embodied in various devices according to the particular application scenario. Such computers may, for example, be provided in vehicles for V2V (vehicle-to-vehicle) applications, or a computer of a V2X (vehicle-to-everything) system where vehicles pass information to some entity X. A computer 2, 3 may be embodied in a PC (personal computer), mobile phone, palmtop device, tablet computer, personal music player, etc., in other applications, and/or may comprise a smart card or secure chip for eID or anonymous attestation applications, e.g. a TPM (trusted platform module) or SHM (secure hardware module). Numerous other applications in the IoT (Internet-of-Things) can be envisaged. In general, the computers 2, 3 may be implemented by computing apparatus comprising one or more general- or special-purpose computing devices, each comprising one or more (real or virtual) machines, providing functionality for implementing the operations described. Such computing apparatus may be practiced in distributed cloud computing environments where tasks are performed by remote processing devices that are linked through a communications network.

The revocation server 5 of FIG. 1 may be implemented by a web server hosting a public bulletin board, or a server operated by any entity trusted to publish information as described below. In some embodiments, the required information could be published by the signing computer 2 by sending directly to verifier computer(s) 3, e.g. where the scheme is implemented within a defined group of computers known to all members of the group. Revocation server 5 is then not required.

As indicated schematically in FIG. 1, each of the signing and verifier computers 2, 3 stores data required for operation of the scheme in memory operatively associated with that computer. Signing computer 2 stores a public-private key pair $(pk_S, sk_S)$ of a signature scheme, where $sk_S$ is the secret signing key of computer 2 and the public key $pk_S$ is known to (all) verifier computer(s) 3. Verifier computer 3 thus stores the public signing key $pk_S$ of each signing computer 2 in system 1. Verifier computer 3 also stores a public-private key pair ($pk_{ch}$, $sk_{ch}$) of a chameleon hash scheme described below. Here $sk_{ch}$ is the secret hash key of that verifier computer 3, and the public hash key $pk_{ch}$ is known to all other computers 2, 3 in system 1. Signing computer 2 thus stores the public hash key $pk_{ch}$ of each verifier computer 3, and each verifier computer stores the public hash key of all other verifier computers. Computers 2, 3 typically also store other data, such as security parameters for cryptographic protocols, any additional communication keys, etc., which may be used in operation of the system.

Figure 2:
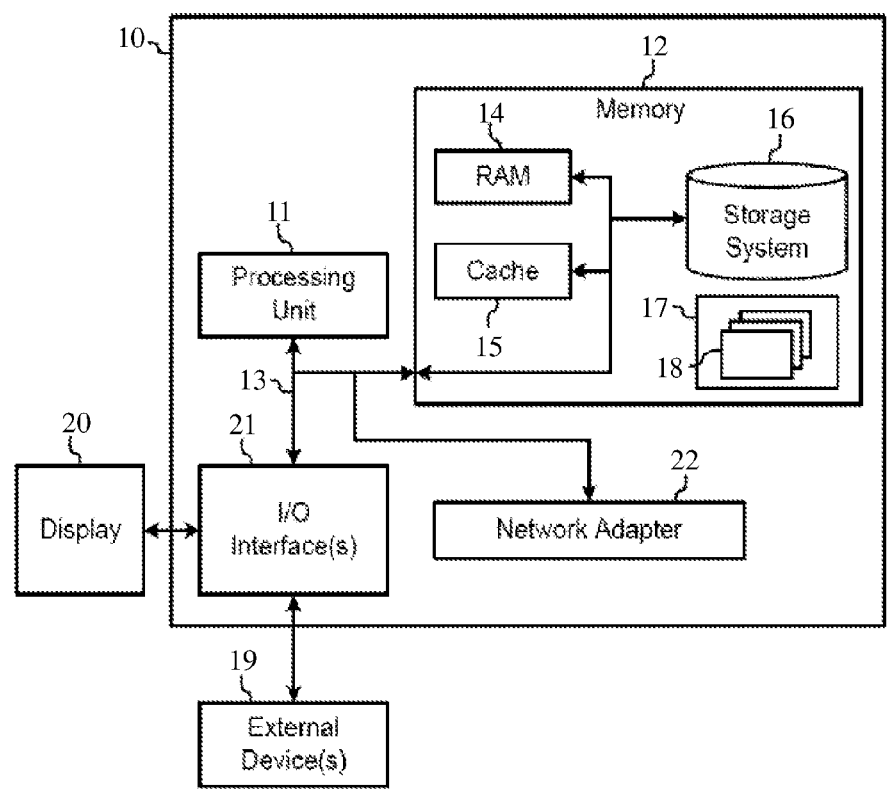
FIG. 2 is a generalized schematic of a computer in the FIG. 1 system.

The functionality of computers 2, 3 for operation of the scheme described below may be implemented by logic embodied in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types. FIG. 2 is a block diagram of exemplary computing apparatus for implementing a computer of system 1. The computing apparatus is shown in the form of a general-purpose computer 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 19 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 13 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

Figure 3:
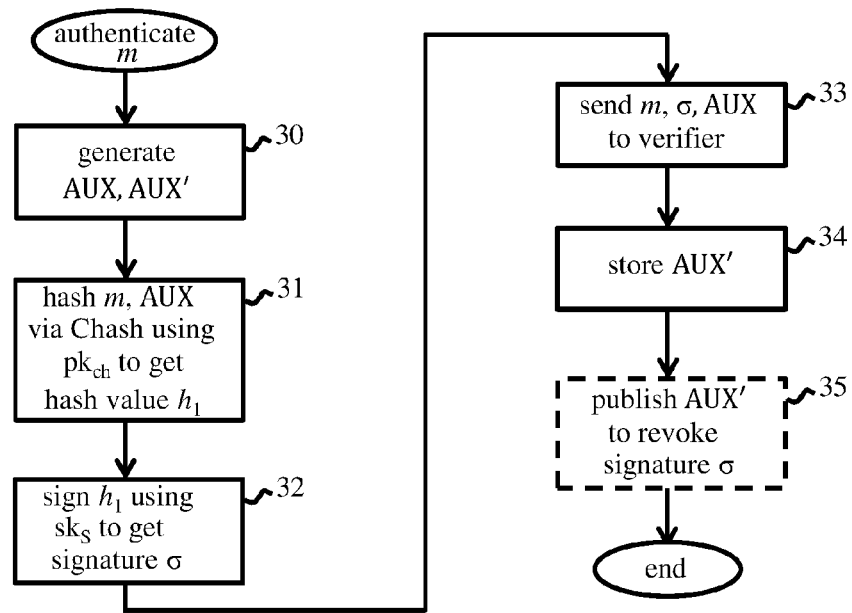
FIG. 3 indicates operations performed by a signer computer in operation of the FIG. 1 system.

FIG. 3 indicates operations performed by signer computer 2 to authenticate a message m sent to verifier computer 3. Such a message m may comprise any data generated by, or otherwise provided at, the signer computer for communication to the verifier computer. To sign the message m with a revocable signature, signer computer 2 generates first and second auxiliary data AUX and AUX' as indicated at block 30. The auxiliary data AUX and AUX' are respectively dependent on a public key and a private key of a public-private key pair for the message. Thus, as illustrated by examples below, the first auxiliary data AUX (which corresponds to the public key of the pair) can be computed from the second auxiliary data AUX' (which corresponds to the secret key of the pair), but the reverse operation—deriving AUX' from AUX—is computationally infeasible. In block 31, signing computer 2 hashes (at least) the message m and the first auxiliary data AUX via a chameleon hash algorithm CHash to produce a first hash value $h_1$. This operation uses the public hash key $pk_{ch}$ of verifier computer 3 and is explained further below. In block 32, the signing computer uses its secret signing key $sk_S$ to sign (at least) the first hash value $h_1$ to produce a signature σ. In block 33, the signing computer sends the message m, the signature σ, and the first auxiliary data AUX to verifier computer 3. The second auxiliary data AUX' is stored by signer computer 2 as indicated by block 34. The signing operation is then complete. However, when (or if) at some subsequent time it is desired to revoke the signature σ, the signing computer simply publishes the second auxiliary data AUX' as indicated by optional block 35. In the FIG. 1 example, the signing computer 2 sends the second auxiliary data AUX' to revocation server 5 which publishes this data on a bulletin board accessible to verifier computer(s) 3 via network 4. Whether or when the second auxiliary data AUX' is published will depend on the particular application scenario. For example, the auxiliary data AUX' may be published at some arbitrary time if it is decided, for whatever reason, to revoke the signature. In other applications it may be desirable that signatures remain valid for a predetermined time only. In such cases, the signing computer can publish AUX' a predetermined time period after sending the signed message. The signing computer 2 may therefore store AUX' (block 34) in association with a timestamp indicating the required publication time, or with any other associated data required for determining whether AUX' should be published in a given application.

Figure 4:
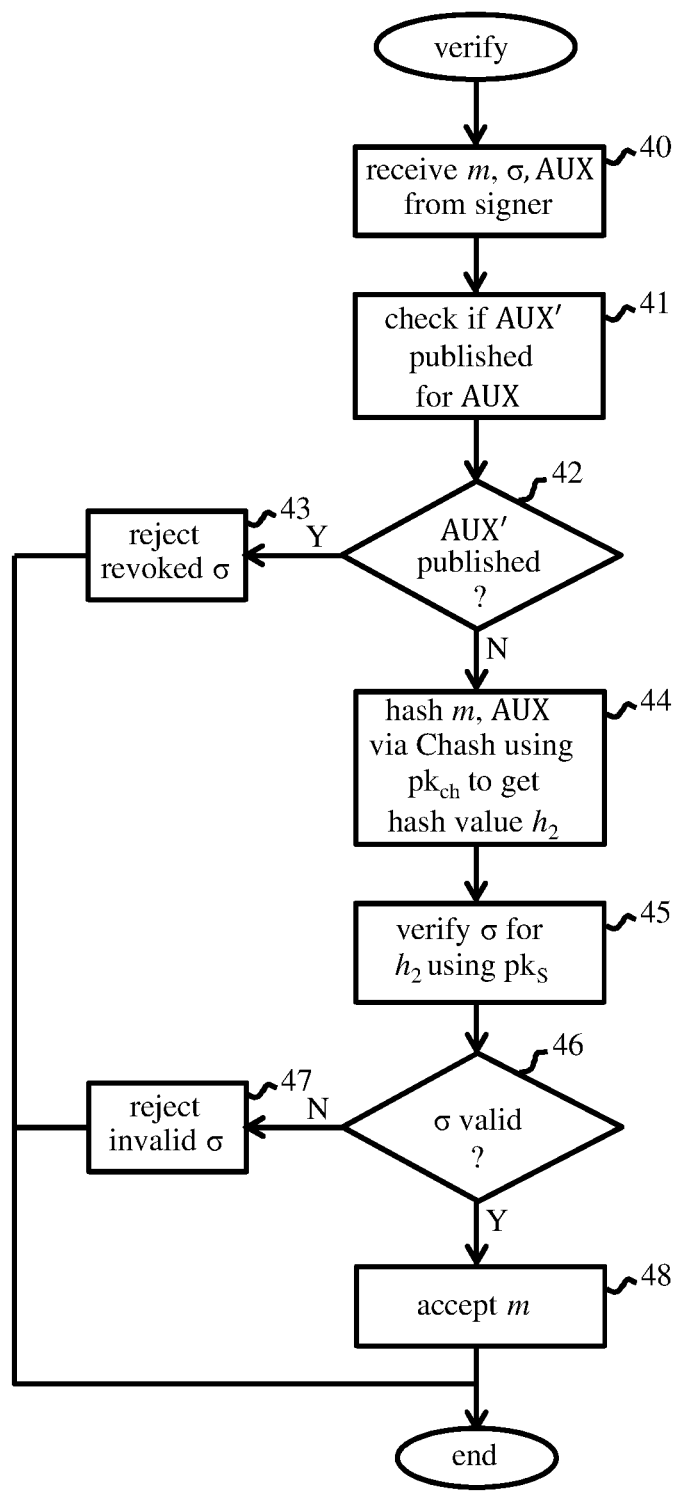
FIG. 4 indicates operations performed by a verifier computer in operation of the system.

FIG. 4 indicates operations performed by verifier computer 3 to verify authenticity of a message from signing computer 2. In general, the signed message may be received directly from signing computer 2, or may be received from another verifier computer 3 which received and authenticated the message itself and then transferred the signed message on to one or more other computers in the system. Either way, in response to receipt of the message m with the signature σ and first auxiliary data AUX in block 40, the verifier computer first checks in block 41 whether second auxiliary data AUX' corresponding to the first auxiliary data AUX has been published. In this example, therefore, verifier computer 3 contacts revocation server 5 to check the bulletin board for publication of an AUX' corresponding AUX. If AUX' has been published, as indicated by "Yes" (Y) at decision block 42, then the signature has been revoked. The signed message is then rejected in block 43 and operation terminates. If AUX' has not been published, as indicated by "No" (N) at decision block 42, then operation proceeds to block 44. The verifier computer hashes (at least) the received message m and first auxiliary data AUX via the chameleon hash algorithm CHash to produce a second hash value $h_2$. This operation is performed using the public hash key $pk_{ch}$ used by signer computer 2 in block 31 of FIG. 3. The second hash value $h_2$ will thus be the same as the first hash value $h_1$ if all operations have been performed correctly. In block 45, the verifier computer uses the public signing key $pk_S$ of signing computer 2 to check validity of the signature a with respect to the second hash value $h_2$. If the signature fails this verification procedure ("No" at decision block 46), then the signature is rejected as invalid in block 47 and operation terminates. If the signature is validated at block 46, then the signed message is accepted as authentic in block 48, and the process is complete.

The above method permits selective revocation of any signature a when desired, simply by publishing the second auxiliary data AUX'. This data AUX' effectively provides an ephemeral trapdoor, the publication of which allows a recipient to equivocate a specific signature to any other message. Hence, if this trapdoor becomes known, the signature loses integrity for the message. In other words, the signature is no longer transferable to other parties. As long as this trapdoor is not released, however, the signature remains valid and is transferable. Unlike conventional chameleon hash schemes, the verifier, holding $sk_{ch}$, cannot generate collisions (i.e. find values such that another message m' gives the same hash value as the signed message m), without knowing AUX', while a party who does not know $sk_{ch}$ cannot generate any collisions at all. Once AUX' has been published, the revoked signature cannot be transferred and contains no useable information. Thus, signatures can be selectively revoked, without invalidating the signer's signing key pair or corresponding certificates, while at the same time preserving privacy.

The above method may be employed, for example, in a car2X communication system, where each entity periodically sends signed sensor data, such as speed, location, environmental conditions, etc. At some later point in time, these signatures should be revoked. For example, it may be specified that each signature should only be valid for five minutes. After these five minutes, the signature should no longer contain any useable information. This is crucial for data-protection, data-minimization and privacy in general, as sensitive personal data, e.g., location, is involved, but is needed in that particular time-frame. The above method readily fulfils these requirements.

An exemplary embodiment will now be described in more detail. Some preliminary issues are discussed first.

$\lambda \in \mathbb{N}$ denotes our security parameter. All algorithms implicitly take $1^\lambda$ (the string consisting of $\lambda$ 1s) as an additional input. We write $\alpha \leftarrow (x)$ if $\alpha$ is assigned the output of algorithm A with input x. If A is randomized it will be clear from the context. An algorithm is efficient if it runs in probabilistic polynomial time (ppt) in the length of its input. The algorithms may return a special error symbol $\bot \in \{0,1\}^*$ denoting an exception. In the following, all algorithms are ppt if not explicitly mentioned otherwise.

A function $\nu: \mathbb{N} \to \mathbb{R}_{\geq 0}$ is negligible, if it vanishes faster than every inverse polynomial. That is, for every $k \in \mathbb{N}$ there exists an $n_0 \in \mathbb{N}$ such that $\nu(n) \leq n^{-k}$ for all $n > n_0$.

Let $(n, p, q, e, d) \leftarrow \text{RSAKGen}(1^\lambda)$ be an instance generator which returns an RSA-modulus $n = pq$, where p and q are distinct primes, $e > 1$ is an integer coprime to $(p-1)(q-1)$, and $de \equiv 1 \bmod (p-1)(q-1)$. We require that RSAKGen outputs n with the same bit-length. The RSA-Problem associated to RSAKGen is, given n, e and $y \leftarrow \mathbb{Z}_n^*$ to find an x such that $x^e \equiv y \bmod n$. Likewise, the RSA-Assumption now states that for every efficient adversary $\mathcal{A}$ $\Pr[(n, p, q, e, d) \leftarrow \text{RSAKGen}(1^\lambda), y \leftarrow \mathbb{Z}_n^*, x \leftarrow \mathcal{A}(n, e, y): x^e \equiv y \bmod n] \leq \nu(\lambda)$ for some negligible function $\nu$.

Digital signatures are well known in cryptography (see e.g. "A method for obtaining digital signatures and public-key cryptosystems", Rivest, Shamir, Adleman, Commun. ACM, 26(1):96-99, 1983). They allow the holder of a secret key to sign a message, while with knowledge of the corresponding public key everyone can verify whether a given signature was actually endorsed by the signer.

A standard digital signature scheme DSIG consists of three algorithms. In particular, DSIG:=(KGen, Sign, Verify) as follows.

KGen.

The algorithm KGen outputs the public and private key of the signer, where $\lambda$ is the security parameter:

$$(pk_S, sk_S) \leftarrow KGen(1^\lambda)$$

Sign.

The algorithm Sign gets as input the secret key $sk_S$, and the message $m \in \mathcal{M}$ to sign, where $\lambda$ is the security parameter and $\mathcal{M}$ is the message space. It outputs a signature σ:

$$\sigma \leftarrow \text{Sign}(sk_S, m)$$

Verify.

The algorithm Verify outputs a decision bit $d \in \{\text{false}, \text{true}\}$, indicating the validity of the signature σ with respect to m and $pk_S$, where $\lambda$ is the security parameter. In particular:

$$d \leftarrow \text{Verify}(pk_S, m, \sigma)$$

Any digital signature scheme needs to be correct and must be secure against adaptive chosen message attacks (see "A Digital Signature Scheme Secure Against Adaptive Chosen-Message Attacks", Goldwasser et al., SIAM Journal on Computing, 17:281-308, 1988).

In a nutshell, a chameleon hash allows arbitrary collisions to be found if one knows a trapdoor corresponding to the public key (see e.g.: "On the key exposure problem in chameleon hashes", Ateniese & de Medeiros, in SCN, pages 165-179, 2004; and "Chameleon Hashing and Signatures", Krawczyk & Rabin, in Symposium on Network and Distributed Systems Security, pages 143-154, 2000). For the embodiment below we require a special chameleon hash.

Namely, we require that one can prohibit the holder of $sk_{ch}$ from finding collisions. We achieve this by adding additional auxiliary information. Hence, we need to introduce a new framework, which is given next.

A TAG-based chameleon hash with auxiliary input CH consists of four algorithms. In particular, CH:=(CKGen, $CHash_1$, $CHash_2$, CAdapt) as follows.

CKGen.

The algorithm CKGen outputs the public and private key of the scheme, where λ is the security parameter:

$(pk_{ch},sk_{ch}) \leftarrow CKGen(1^\lambda)$ $CHash_1$.

The algorithm $CHash_1$ gets as input the public key $pk_{ch}$, a tag TAG∈$\{0,1\}^\lambda$, and a message m∈$\mathcal{M}$ to hash, where $\mathcal{M}$ is the message space. It outputs a hash $h_1$, randomness (random value) r∈$\mathcal{R}$, where $\mathcal{R}$ is the implicit randomness space, and some auxiliary data AUX and AUX':

$(h_1,r,AUX,AUX') \leftarrow CHash_1(pk_{ch},TAG,m)$ $CHash_2$.

The algorithm $CHash_2$ gets as input the public key $pk_{ch}$, randomness r∈$\mathcal{R}$, a tag TAG∈$\{0,1\}^\lambda$, and a message m∈$\mathcal{M}$ to hash. It outputs a hash $h_2$:

$h_2 \leftarrow CHash_2(pk_{ch},TAG,m,r,AUX)$

This is the "public" hash algorithm which does not receive AUX'.

CAdapt.

The algorithm CAdapt outputs new randomness r' and a new tag TAG' on input of $sk_{ch}$, tag TAG∈$\{0,1\}^\lambda$, and the old message m, the new message m', and the auxiliary data AUX and AUX'. In particular:

$(r',TAG') \leftarrow CAdapt(sk_{ch},m,m',TAG,r,AUX,AUX')$

For each CH we require the correctness properties to hold. In particular, we require that for all λ∈$\mathbb{N}$, for all ($pk_{ch}$, $sk_{ch}$)←CKGen($1^\lambda$), for all m∈$\mathcal{M}$, for all TAG ∈$\{0,1\}^\lambda$, for all(h, r, AUX, AUX')←$CHash_1$($pk_{ch}$, TAG, m), and for all m'∈$\mathcal{M}$, we have:

$CHash_2(pk_{ch},TAG,m,r,AUX)=CHash_2(pk_{ch},TAG',m',r',AUX)$ for all (r', TAG')←CAdapt($sk_{ch}$, m, m', TAG, r, AUX, AUX'), and also for all λ∈$\mathbb{N}$, for all ($pk_{ch}$, $sk_{ch}$)←CKGen ($1^\lambda$), for all m∈$\mathcal{M}$, for all r, for all TAG∈$\{0,1\}^\lambda$, and for all (h, r, AUX, AUX')←$CHash_1$($pk_{ch}$, TAG, m), we have:

$h \leftarrow CHash_2(pk_{ch},TAG,m,r,AUX)$

Again, this definition captures perfect correctness. The algorithm CAdapt thus allows collisions to be generated by a holder of $sk_{ch}$ and AUX', and is defined for completeness of the scheme.

The security definitions we require are: the holder of $sk_{ch}$ should not be able to find collisions without knowing AUX', while an outsider (one who does not know $sk_{ch}$) should not be able to find any collisions at all. It should also be infeasible to decide whether the hash is a produced collision or not, even for the generator of $sk_{ch}$.

In the instantiation to follow, the second auxiliary data AUX' comprises a pair of prime values p', q', and the first auxiliary data AUX comprises the product p'q' of these values. In particular, the first auxiliary data AUX is an additional RSA-modulus n'=p'q' generated by RSAKGen ($1^\lambda$). AUX thus corresponds to the public key of an RSA key-pair, while AUX' corresponds to the secret key of the pair. Only if the factorization of n', contained in AUX', and the factorization of n given in the secret key $sk_{ch}$, is known, a collision can be produced.

Let $\mathcal{H}_n$: $\{0, 1\}^* \leftarrow \mathbb{Z}_n^*$ denote a random oracle. Let CH:=(CKGen, $CHash_1$, $CHash_2$, CAdapt) be as follows.

CKGen.

The algorithm CKGen generates the key pair in the following way:

Generate two distinct primes p and q using RSAKGen ($1^\lambda$). Set $sk_{ch}$=(p, q). Let n=pq. Choose a prime e>$n^3$. Set $pk_{ch}$=(n, e).

Return ($pk_{ch}$, $sk_{ch}$).

$CHash_1$.

To hash a message m with respect to $pk_{ch}$ do:

Check that e is prime and that e>$n^3$. If this is not the case, return ⊥.

Generate two distinct primes p' and q' using RSAKGen ($1^\lambda$). Set n'=p'q'. Let AUX=n', and AUX'=(p', q'). If gcd (n, n')≠1, (where gcd=greatest common devisor), start over.

Let r←$\mathbb{Z}_{nn'}^*$. Let g←$\mathcal{H}_{nn'}$(AUX, TAG, m) for a random tag TAG. Set $h_1$←$gr^e$ mod nn'. Note, the condition e>$n^3$ implies that e>nn' and thus gcd (nn', e)=1, which makes our analysis simpler.

Return ($h_1$, r, TAG, AUX, AUX').

$CHash_2$.

To hash a message m with a tag TAG, randomness r, and first auxiliary data AUX, w.r.t. (with respect to) $pk_{ch}$ do:

Check that e is prime and that e>$n^3$, and TAG∈$\{0,1\}^\lambda$. If this is not the case, return ⊥.

Return ⊥ if r∉$\mathbb{Z}_{nn'}^*$ ∨ nn'≥e.

Let g← $\mathcal{H}_{nn'}$(AUX,TAG,m). Set $h_2$←$gr^e$ mod nn'.

Return $h_2$.

CAdapt.

To find collision w.r.t. m with a tag TAG, m', randomness r, and auxiliary data AUX, AUX', and $sk_{ch}$, do:

Check that AUX=p'q', where p' and q' are taken from AUX', and TAG ∈$\{0,1\}^\lambda$. If this is not the case, return ⊥.

Return ⊥ if r∉$\mathbb{Z}_{nn'}^*$ ∨ nn'≥e.

Compute d such that de≡1 mod φ(nn'), where φ is Euler's Totient Function. This value is guaranteed to exist due to the choice of e.

Compute g← $\mathcal{H}_{nn'}$(AUX, TAG, m) and h←$gr^e$ mod nn'. Draw TAG'∈$\{0,1\}^\lambda$. If TAG'=TAG redraw till TAG'≠TAG.

Compute g'← $\mathcal{H}_{nn'}$(AUX, TAG', m') and randomness r'←$(h(g'^{-1}))^d$ mod nn'

Return (r', TAG').

Setup.

The setup is required prior to using the method. We also use a PKI, where public keys are authentically stored. PKI systems are well known in the art and the operational details are orthogonal to the system described.

The signer generates a key pair of signature scheme, i.e., ($pk_S$, $sk_S$)←KGen($1^\lambda$).

The verifier generates a key pair of the above chameleon hash, i.e., ($pk_{ch}$, $sk_{ch}$)←CKGen($1^\lambda$).

The verifier also generates a ZK PoK (zero-knowledge proof of knowledge) Π that it actually knows the factorization of n contained in $pk_{ch}$. Such proofs are well known in the art. We assume that Π is part of $pk_{ch}$, and also checked upon reception. This can also be done via the PKI.

Signing.

Figure 5:
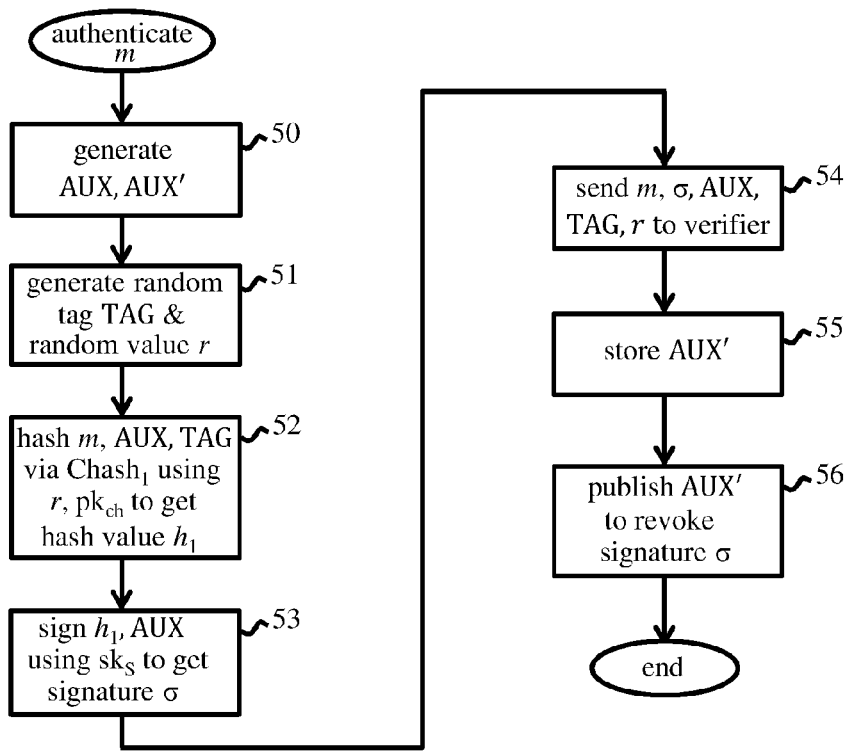
FIG. 5 indicates operations performed by a signer computer in an exemplary embodiment.

FIG. 5 indicates operations performed by signer computer 2 to sign a message m with a revocable signature. In block

50, signer computer 2 generates the first and second auxiliary data AUX and AUX' as in step 2 of algorithm CHash$_1$ above. In block 51, signing computer 2 generates the random tag TAG$\in\{0,1\}^\lambda$ and random value r$\leftarrow\mathbb{Z}_{nn'}$*, for CHash$_1$. In block 52, signing computer 2 hashes the message m, using the chameleon hash with the public key pk$_{ch}$ of the verifier and random value r, with the tag TAG and first auxiliary data AUX as in step 3 of CHash$_1$ above to obtain hash value h$_1$. In block 53, the signing computer uses DSIG to sign the hash value h$_1$ and first auxiliary data AUX under sk$_S$, producing a signature a, i.e. $\sigma\leftarrow$Sign(sk$_S$, (h$_1$, AUX)). In block 54, signing computer 2 sends the message m, the signature $\sigma$, the first auxiliary data AUX, the random value r and the tag TAG to verifier computer 3. The second auxiliary data AUX' is stored by the signing computer as indicated by block 55. The signing operation is then complete. However, after a predetermined time interval, the signing computer publishes the second auxiliary data AUX', as indicated by block 56, revoking the signature $\sigma$. The signature thus remains valid during that time interval only.

Verification.

Figure 6:
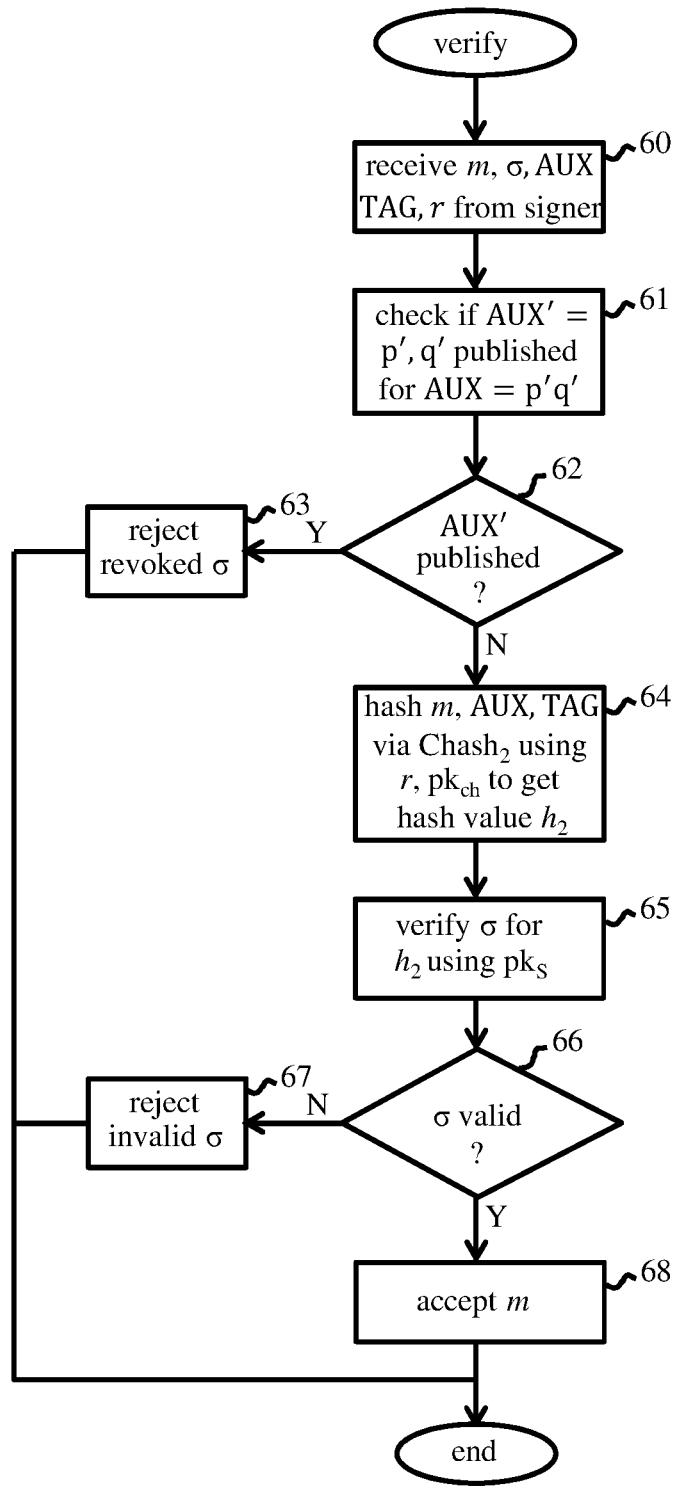
FIG. 6 indicates operations performed by a verifier computer in the embodiment.

FIG. 6 indicates blocks performed by a verifier computer 3 in response to receipt in block 60 of a message m, with signature $\sigma$, first auxiliary data AUX, random value r and tag TAG. In block 61, the verifier computer checks whether any AUX'=(p', q') has been published where p'q'=AUX. (Some trusted entity, such as revocation server 5, could precompute the product p'q' when an AUX'=(p', q') is published to save computational effort by the verifier). If AUX' has been published ("Yes" at decision block 62), then the signature has been revoked and is rejected in block 63. If AUX' has not been published ("No" at decision block 62), then operation proceeds to block 64. The verifier computer hashes the received message m, first auxiliary data AUX and tag TAG, using r and pk$_{ch}$, to produce a hash value h$_2$ as in step 3 of algorithm CHash$_2$ above, i.e. h$_2\leftarrow$CHash$_2$(pk$_{ch}$, TAG, m, r, AUX). In block 65, the verifier computer uses the public signing key pk$_S$ of signing computer 2 to check correctness of $\sigma$ with respect to h$_2$, i.e. d$\leftarrow$Verify(pk$_S$, (h$_2$, AUX), $\sigma$). If the signature is invalid (d=false, decision "No" at block 66) the signature is rejected in block 67. If the signature is valid (d=true, decision "Yes" at block 66), then the signed message is accepted as authentic in block 68, and the process is complete.

As before, the above embodiment allows a signer to revoke signatures at any point in time, without having to obtain new signing keys or corresponding certificates/credentials, and a revoked signature does not contain any useful information. Use of the tag TAG in this embodiment adds accountability in the system. The signer is bound to his signatures and can prove whether or not any particular signature was generated by him using pseudo-random generators and functions, and storing the corresponding pre-image.

Various changes and modifications can be made to the exemplary embodiments described above. For example, the second auxiliary data may comprise only one of the prime values p' and q', and a verifier may check whether the value in AUX' is a factor of the product AUX=p'q'. Other key generation algorithms may also be used to generate AUX, AUX'. As will be apparent to those skilled in the art, embodiments may be instantiated using different CHash algorithms and/or different cryptographic parameters to those specified above. The auxiliary data AUX' may be published in any convenient manner which makes this data accessible to verifiers in a given system.

While exemplary applications have been mentioned above, numerous other applications can be envisaged for the revocable signature scheme. Examples include SSL/TLS (Secure Sockets Layer/Transport Layer Security) applications, patch deployment, emails, PGP (Pretty Good Privacy) encryption protocols, contracts and signed code.

Blocks of flow diagrams may be performed in a different order to that shown, and some blocks may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for authenticating a message to a verifier computer via a revocable signature, the method comprising:
   generating, using a signing computer, first auxiliary data and second auxiliary data respectively dependent on a public key and a private key of a public-private key pair for the message;
   hashing, using the signing computer, the message and the first auxiliary data via a chameleon hash algorithm, using a public hash key of the verifier computer, to produce a first hash value;
   signing, using the signing computer, the first hash value, using a secret signing key of the signing computer, to produce a signature;
   sending, using the signing computer, the message, the signature and the first auxiliary data to the verifier computer;
   storing, using the signing computer, the second auxiliary data;
   using the signing computer, publishing the second auxiliary data when it is subsequently desired to revoke the signature; and
   selectively revoking the signature based at least in part on the second auxiliary data without invalidating the key pair.

2. The method as claimed in claim 1 including, using the signing computer, publishing the second auxiliary data a predetermined time period after sending the message to the verifier computer.

3. The method as claimed in claim 1 including, using the signing computer:
   generating a random tag for the message;
   producing the first hash value by hashing the message, the first auxiliary data and said tag; and sending the tag to the verifier computer.

4. The method as claimed in claim 3 including, using the signing computer:
   selecting a random value r for use in said hash algorithm;
   using the random value r to produce the first hash value via said hash algorithm; and
   sending the random value r to the verifier computer.

5. The method as claimed in claim 4 including, using the signing computer, producing the signature by signing the first hash value and the first auxiliary data.

6. The method as claimed in claim 1 wherein the first auxiliary data comprises the product p'q' of a pair of prime values p',q', and wherein the second auxiliary data comprises at least one of said prime values.

7. The method as claimed in claim 6 wherein the second auxiliary data comprises said pair of prime values.

8. The method as claimed in claim 1 including, using the verifier computer in response to receipt of the message, the signature and the first auxiliary data, checking whether the second auxiliary data corresponding to the first auxiliary data has been published, if so rejecting the signature and if not:
hashing the message and the first auxiliary data via said chameleon hash algorithm using said public hash key to produce a second hash value; and
using a public signing key of the signing computer to check validity of said signature with respect to the second hash value.

9. The method as claimed in claim 3 including, using the verifier computer in response to receipt of the message, the signature, the first auxiliary data, and said tag, checking whether the second auxiliary data corresponding to the first auxiliary data has been published, if so rejecting the signature and if not:
hashing the message, the first auxiliary data and said tag via said chameleon hash algorithm using said public hash key to produce a second hash value; and
using a public signing key of the signing computer to check validity of said signature with respect to the second hash value.

10. The method as claimed in claim 4 including, using the verifier computer in response to receipt of the message, the signature, the first auxiliary data, said tag and said random value r, checking whether the second auxiliary data corresponding to the first auxiliary data has been published, if so rejecting the signature and if not:
hashing the message, the first auxiliary data and said tag via said chameleon hash algorithm, using said public hash key and said random value r, to produce a second hash value; and
using a public signing key of the signing computer to check validity of said signature with respect to the second hash value.

11. A computer program product for authenticating a message, via a revocable signature at a signing computer, to a verifier computer, said computer program product comprising a computer readable non-transitory storage medium having program instructions embodied therein, the program instructions being executable by the signing computer to cause the signing computer to:
generate first auxiliary data and second auxiliary data respectively dependent on a public key and a private key of a public-private key pair for the message;
hash the message and the first auxiliary data via a chameleon hash algorithm, using a public hash key of the verifier computer, to produce a first hash value;
sign the first hash value, using a secret signing key of the signing computer, to produce a signature;
send the message, the signature and the first auxiliary data to the verifier computer, and store the second auxiliary data;
publish the second auxiliary data when it is subsequently desired to revoke the signature; and
selectively revoke the signature based at least in part on the second auxiliary data without invalidating the key pair.

12. The computer program product as claimed in claim 11 wherein said program instructions are executable by the signing computer to cause the signing computer to publish the second auxiliary data a predetermined time period after sending the message to the verifier computer.

13. The computer program product as claimed in claim 11 wherein said program instructions are executable by the signing computer to cause the signing computer to:
generate a random tag for the message;
produce the first hash value by hashing the message, the first auxiliary data and said tag; and send the tag to the verifier computer.

14. The computer program product as claimed in claim 11 wherein said program instructions are executable such that the first auxiliary data comprises the product p'q' of a pair of prime values and wherein the second auxiliary data comprises at least one of said prime values.

15. The computer program product as claimed in claim 14 wherein said program instructions are executable such that the second auxiliary data comprises said pair of prime values.

16. A system for authenticating a message, the system comprising a signing computer and a verifier computer, wherein the signing computer and the verifier computer comprise a processing unit and a memory; wherein the signing computer is adapted to authenticate the message to the verifier computer via a revocable signature by:
generating first auxiliary data and second auxiliary data respectively dependent on a public key and a private key of a public-private key pair for the message;
hashing the message and the first auxiliary data via a chameleon hash algorithm, using a public hash key of the verifier computer, to produce a first hash value;
signing the first hash value, using a secret signing key of the signing computer, to produce a signature;
sending the message, the signature and the first auxiliary data to the verifier computer, and storing the second auxiliary data;
wherein the verifier computer is adapted, in response to receipt of the message, the signature and the first auxiliary data, to check whether the second auxiliary data corresponding to the first auxiliary data has been published, and if so, rejecting the signature, and if not, hashing the message and the first auxiliary data via said chameleon hash algorithm using said public hash key to produce a second hash value;
using a public signing key of the signing computer to check validity of said signature with respect to the second hash value;
wherein the signing computer is adapted to publish the second auxiliary data when it is subsequently desired to revoke the signature; and
selectively revoking the signature based at least in part on the second auxiliary data without invalidating the key pair.

17. The system as claimed in claim 16 wherein the signing computer is adapted to publish the second auxiliary data a predetermined time period after sending the message to the verifier computer.

* * * * *